United States Patent
Zhang et al.

Patent Number: 5,298,187
Date of Patent: Mar. 29, 1994

[54] NON-TOXIC CHEMICAL OXYGEN GENERATING COMPOSITIONS

[75] Inventors: Yunchang Zhang, Lenexa; James C. Cannon, Olathe, both of Kans.

[73] Assignee: Puritan-Bennett Corporation, Lenexa, Kans.

[21] Appl. No.: 851,171

[22] Filed: Mar. 13, 1992

[51] Int. Cl.[5] .................. C01B 11/14; A62B 21/00
[52] U.S. Cl. .................. 252/187.31; 252/187.1
[58] Field of Search .................. 252/187.31, 187.1

[56] References Cited
U.S. PATENT DOCUMENTS

| | | | |
|---|---|---|---|
| 1,027,333 | 5/1912 | Hershkowitsch | 252/187.31 |
| 2,004,243 | 6/1935 | Hloch | 23/6 |
| 3,293,187 | 12/1966 | Markowitz | 252/186 |
| 3,405,068 | 10/1968 | Hiltz | 252/187.31 |
| 3,702,305 | 11/1972 | Thompson | 25/187.31 |
| 3,736,104 | 5/1973 | Churchill et al. | 23/281 |
| 5,049,306 | 9/1991 | Greer | 252/187.31 |
| 5,198,147 | 3/1993 | Zhang et al. | 252/187.31 |

FOREIGN PATENT DOCUMENTS

1035248  9/1989  China.

Primary Examiner—Richard D. Lovering
Assistant Examiner—Joseph D. Anthony
Attorney, Agent, or Firm—Hovey, Williams, Timmons & Collins

[57] ABSTRACT

An oxygen-generating candle composition is disclosed of the type that includes an amount of an alkali metal chlorate or perchlorate oxygen source and which upon initiation and decomposition yields oxygen and residual chlorine, wherein the improvement comprises a non-toxic additive in the candle composition for suppression of the residual chlorine and to enhance uniform oxygen generation and evolution. The additive is selected from the group consisting of from about 0.05% to about 10% by weight of lithium aluminate, metaborate, tetraborate, phosphate or pyrophosphate, metasilicate or orthsilicate, or carbonate, calcium phosphate or pyrophosphate, strontium carbonate or phosphate, or sodium metasilicate or orthosilicate. A metal oxide catalyst, a metal powder fuel, and a binder or filler are also included in the composition.

28 Claims, 5 Drawing Sheets

1) 99% $NaClO_3$ + 1% $CoO_x$
2) 95% $NaClO_3$ + 4% $SrCO_3$ + 1% $CoO_x$
3) 98% $NaClO_3$ + 1% $Li_2B_4O_7$ + 1% $CoO_x$
4) 97% $NaClO_3$ + 2% $Ca_2P_2O_7$ + 1% $CoO_x$
5) 97% $NaClO_3$ + 2% $Na_2SiO_3$ + 1% $CoO_x$
6) 98% $NaClO_3$ + 1% $Li_3PO_4$ + 1% $CoO_x$

Fig. 1

1.) 99% NaClO$_3$ + 1% CoOx
2.) 95% NaClO$_3$ + 4% SrCO$_3$ + 1% CoOx
3.) 98% NaClO$_3$ + 1% Li$_2$B$_4$O$_7$ + 1% CoOx
4.) 97% NaClO$_3$ + 2% Ca$_2$P$_2$O$_7$ + 1% CoOx
5.) 97% NaClO$_3$ + 2% Na$_2$SiO$_3$ + 1% CoOx
6.) 98% NaClO$_3$ + 1% Li$_3$PO$_4$ + 1% CoOx

Fig. 1A

7.) 98% NaClO$_3$ + 1% Ca(OH)$_2$ + 1% CoOx
8.) 98% NaClO$_3$ + 1% Li$_2$CO$_3$ + 1% CoOx
9.) 98.5% NaClO$_3$ + 0.5% Li$_2$O$_2$ + 1% CoOx
10.) 95% NaClO$_3$ + 4% BaO$_2$ + 1% CoOx
11.) 98% NaClO$_3$ + 1% LiBO$_2$ + 1% CoOx
12.) 100% NaClO$_3$

Fig. 2

1.) 99% NaClO$_3$ + 1% CoOx
2.) 97% NaClO$_3$ + 2% NaHCO$_3$ + 1% CoOx
3.) 98% NaClO$_3$ + 1% NaCO$_3$ + 1% CoOx
4.) 97% NaClO$_3$ + 2% NaCr$_2$O$_7$·2H$_2$O + 1% CoOx
5.) 96% NaClO$_3$ + 3% KOH + 1% CoOx
6.) 96% NaClO$_3$ + 3% Na$_3$PO$_4$·12H$_2$O + 1% CoOx

Fig. 2A

7.) 96% NaClO$_3$ + 3% NaOH + 1% CoOx
8.) 95% NaClO$_3$ + 4% Ba(OH)$_2$·H$_2$O + 1% CoOx
9.) 97% NaClO$_3$ + 2% LiOH + 1% CoOx
10.) 97% NaClO$_3$ + 2% NaBO$_2$ + 1% CoOx
11.) 97% NaClO$_3$ + 2% Sr(OH)$_2$·8H$_2$O + 1% CoOx
12.) 100% NaClO$_3$

NON-TOXIC CHEMICAL OXYGEN GENERATING COMPOSITIONS

BACKGROUND OF THE INVENTION

This invention is broadly concerned with an improved candle for generating breathable oxygen by initiation and decomposition of an alkaline metal chlorate or perchlorate source. During decomposition of the chlorate or perchlorate, toxic free chlorine gas may be evolved. Furthermore, irregular decomposition of the alkali metal chlorate or perchlorate will result in uneven evolution of oxygen.

Thus, this invention specifically relates to an oxygen generating alkali metal chlorate or perchlorate candle composition having a non-toxic additive compound incorporated therein which regulates and smooths oxygen decomposition and suppresses formation of toxic free chlorine gas.

DESCRIPTION OF THE PRIOR ART

Chemical oxygen generating candles containing alkali metal chlorates or perchlorates have long been used as an emergency supply of breathable oxygen where weight and space limitations are important factors. Exemplary in this respect are aircraft which fly at high altitudes, submarines, and other closed atmospheric enclosures which house personnel or passengers.

Many previous oxygen candles which employed an alkali metal chlorate or perchlorate compound as the oxygen source have utilized barium peroxide ($BaO_2$) as an additive to smooth out the decomposition rate of the chlorate or perchlorate and to suppress formation of free chlorine which is a toxic gas. A metal oxide catalyst has also commonly been used to facilitate decomposition of the oxygen source, and a powdered metal fuel such as iron powder incorporated to furnish extra heat to help sustain the reaction process. A small portion of glass powder and/or glass fibers have also been employed as a binder. Although $BaO_2$ performs the function of suppressing free chlorine formation and smoothing oxygen evolution during decomposition of alkali metal chlorate or perchlorate oxygen sources, it is in and of itself a poisonous compound. Unless extraordinary precautions are taken, tiny $BaO_2$ particles may be released along with the oxygen generated, presenting an immediate health hazard to the person breathing the oxygen being generated and possibly contaminating the surrounding atmosphere as well. Equally as importantly, environmental regulations require the use of costly procedures and equipment to dispose of scraps and expended oxygen candles containing $BaO_2$ and/or its reaction products, such as $BaCl_2$.

Several alkali metal oxides such as $Na_2O$, $Na_2O_2$ and $KO_2$ have also been suggested as catalysts for $NaClO_3$ decomposition and to suppress acidic chlorine gas formation, but have not met with widespread usage.

M. M. Markowitz et al., in U.S. Pat. No. 3,293,187 and in an article in I&EC Product Research and Development, 3(4), 323 (1964) disclosed that $Li_2O_2$ and other alkaline compounds can suppress free chlorine formation in lithium perchlorate based oxygen candles. Manganese powder was used as a fuel, and manganese oxides formed during manganese oxidation were suggested as catalysts. In view of the fact that decomposition of such lithium perchlorate compositions tends to produce relatively high concentration of chlorine gas, Markowitz had to use 5% $Li_2O_2$ by weight. With high lithium peroxide loading the integrity of the candle remains a problem since the candle tends to melt and flow away.

U.S. Pat. Nos. 3,702,305 and 3,736,104 disclose use of sodium oxide and peroxide catalyst in a sodium chlorate oxygen candle. However, these alkali metal oxides are air sensitive and caustic. They will absorb moisture and $CO_2$ from the air and decompose, which results in decomposition upon exposure to air with concomitant production, use and storage problems. Candles using such compounds must be produced by a dry process, and production by wet processing is precluded.

Chinese Patent No. 1035248A describes the use of lithium peroxide as a chlorine suppressant in a sodium chlorate oxygen candle. The formulation contains 2%–7% cobalt oxide, 0%–5% $MnO_2$, 1%–6.5% $Li_2O_2$ and 1%–8% kaolin. The ingredients were dry mixed and pressed. The total oxygen generation is 6 liters. Since magnesium is a very active metal and it can react with water and release hydrogen, the procedure is not practical if carried out as a wet process. Magnesium is also relatively difficult to ignite. Furthermore, because a relatively high proportion of lithium peroxide is used, a similar high proportion of cobalt oxide must be employed and several percent of kaolin has to be incorporated to maintain the integrity of the candle. High catalyst and additive loading increases candle weight and lowers the oxygen yield.

Cobalt oxide and lithium peroxide are also relatively expensive chemicals. High loading significantly increases the cost of the candle. The Chinese patent also describes low fuel or no fuel candle compositions. However, no fuel or very low fuel candles are generally more sensitive to environmental temperatures, and have difficulty functioning in cold environments.

SUMMARY OF THE INVENTION

The present invention overcomes the problems noted above and provides a greatly improved oxygen-generating composition which contains no poisonous compounds such as barium peroxide or other toxic compounds, or highly unstable and caustic compounds such as sodium oxide and peroxide and potassium superoxide. The new formulations are suitable for either wet or dry processing. The oxygen candle additives described herein are non-toxic and reasonably stable in air and function both to smooth the sodium chlorate decomposition rate, and to suppress chlorine formation. The additive enhanced alkali metal chlorate or perchlorate formulations function well across a wide range of environmental temperatures.

Broadly speaking, the oxygen generating candle includes an oxygen source which upon initiation and decomposition, yields oxygen, with a non-toxic additive being incorporated into the candle to smooth oxygen evolution and to suppress formation of residual chlorine gas resulting from the side reactions taking place. The additive of the present invention includes one or more alkaline compounds selected from the group consisting of (a) a compound of the formula $M_aH_bX_cO_d$ where M=an alkali metal or alkaline earth metal, a=a number which is one or more, H=hydrogen, b=a number which is 0, or one or more, X=an element chosen from the group consisting of the elements of Group IIIA, the elements of Group IVA, the elements identified by the numbers 15 and 51 of Group VA, the elements of Group IVB, the elements of Group VB, the elements of Group VIB, and the element identified by the number 25 of Group VIIB of the Periodic Table, c=a number which is one or more, O=oxygen, and d=a number which is one or more; (b) lithium, sodium, potassium, rubidium, cesium, magnesium and strontium hydroxides; (c) magnesium, calcium and strontium peroxides; and (d) mixtures of the foregoing.

In particularly preferred forms the candle includes: an alkali metal chlorate or perchlorate oxygen source; from about 0.05% to about 10% by weight of lithium aluminate, metaborate, tetraborate, phosphate or pyrophosphate, metasilicate or othosilicate, or carbonate, calcium phosphate or pyrophosphate, strontium carbonate or phosphate, or sodium metasilicate or othosilicate; a metal oxide catalyst; a metal powder fuel; and a binder or filler.

When used in aircraft, weight is one of the most important factors to be considered. Therefore, $Li_2O_2$, $LiAlO_2$, $LiBO_2$, $Li_2B_4O_7$, $Li_2SiO_3$, $Li_3PO_4$ and $Li_2SiO_3$ are preferred because of their relatively lower molar weight. Substitution of an equimolar amount of one of these lithium compounds for $BaO_2$ reduces the overall candle weight.

It is also an objective to make an oxygen candle which can operate over a wide range of surrounding temperatures. Oxygen candles used in aircraft must function well in a wide temperature band which may range from −30° C. to 60° C. If the candle burns substantially faster at higher surrounding temperatures, a much larger candle must be used in order for the candle to supply oxygen for a required duration over the requested wide range of temperatures.

A sufficient amount of the alkaline additive is introduced into the candle body composition to increase the decomposition temperature of the alkali metal chlorate or perchlorate oxygen source to a level above the melting temperature thereof that assures steady oxygen generation.

DESCRIPTION OF THE PREFERRED EMBODIMENT

Figure 8:
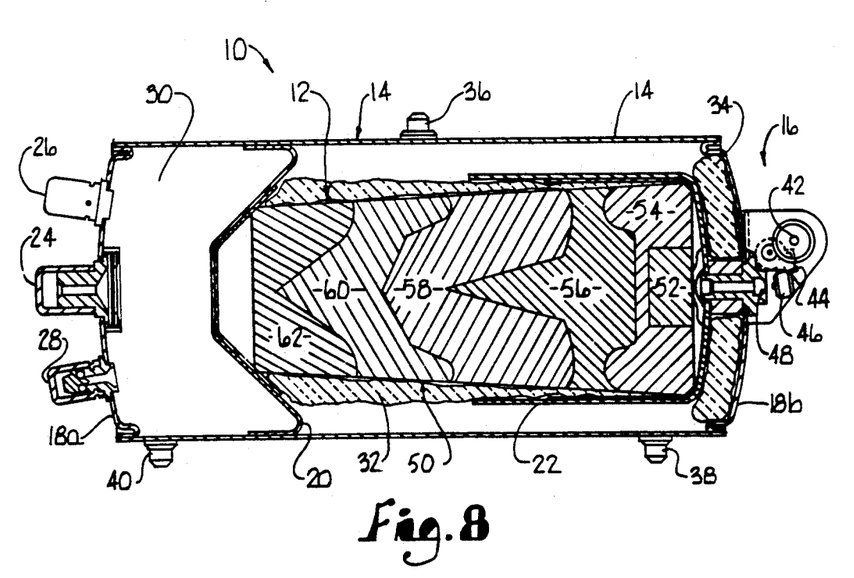
FIG. 8 is a cross-sectional view of a chemical oxygen generator useful in producing oxygen utilizing an alkali metal chlorate or perchlorate candle composition in accordance with the present invention, with a typical candle block being illustrated in cross-section in the generator canister.

Referring now to the drawings, a representative chemical oxygen generator 10 that may be used in accordance with the present invention is illustrated in FIG. 8 and includes candle 12 installed in a canister 14 along with suitable ignition means 16. Those skilled in the art will appreciate that the candle of the invention may be used in connection with any number of other oxygen generation devices.

Canister 14 includes a tubular housing 18 closed by end caps 18a and 18b, an interior core locator partition 20, spatter shield 22, outlet valve 24 and a pair of relief valves 26, 28 mounted on end cap 18a. It is to be understood that the number and location of outlet and relief valves may vary with the overall size and intended use of the apparatus. Conventional filter material (not shown) occupies the space between core locator 20 and end cap 18a. Candle 12 is surrounded by thermal insulation 32, 34. Mounting lugs 36, 38, 40 are provided on the exterior of the canister surface.

Ignition means 16 includes pull pin 42, spring 44, hammer 46 and primer 48. Although a percussion type ignition means is preferred, any suitable form of ignition means may be employed.

Candle 12 broadly includes body 50 and an ignition pellet 52. In order to match various high altitude descent oxygen flow specifications, the preferred candle 12 has a weight of between 222 grams and 228 grams and is 5.0 inches long with a diameter of 1.4 inches at the ignition end and 1.1 inches at the outlet end. The preferred ignition pellet 52 has a diameter of 0.56 inches, is 0.25 inch thick and weighs 1.5 grams. Body 50 consists of an oxygen source and a nontoxic additive compound incorporated into the candle. Candle 12 may be formulated to further include a catalyst, a metal powder fuel, and a binder or filler. The candle 12 may be constructed of multiple layers of varying chemical composition. As shown in FIG. 8, the candle may include a first composition layer 54 in contact with ignition pellet 52, and second composition layer 56 and layers thereafter including a nontoxic additive as described herein. In other embodiments, the first composition layer 54 may also contain the nontoxic additive. The preferred candle includes additional layers 58, 60, 62, although any number of layers may be used.

In operation, a user engages pull pin 42 either directly or by means of a cord or other similar remote activation mechanism. When pin 42 is pulled, spring 44 is actuated, causing hammer 46 to hit primer 48 and effect ignition. Primer 48 ignites pellet 52 loaded at the top of the candle body 50. The heat generated from ignition pellet 52 then initiates reaction and therefore decomposition of the candle body. Once initiated, the candle will sustain an exothermic decomposition reaction at a uniform rate to release oxygen at a stable flow rate until the chemical core has completely reacted.

The gaseous reaction products pass through filter material 30 to remove solid particles and any residual chlorine and carbon monoxide and thence through outlet valve 24 which may be connected to a gas manifold or other oxygen delivery means. In the event of blockage of outlet valve 24 or other increased pressure inside canister, relief valves 26, 28 allow gases to escape. The generated oxygen which passes through outlet valve 24 has the high purity required for breathing. In preferred embodiments the chlorine level is lower than 50 ppb, carbon monoxide level is lower then 3 ppm and carbon dioxide is lower than 1500 ppm. The candle operates well over wide environmental temperatures.

Alkali metal chlorates or perchlorates such as $NaClO_3$, $KClO_3$, $LiClO_3$, $KClO_4$, $LiClO_4$ and $NaClO_4$ or mixtures thereof can be used as oxygen generating sources. The preferred chlorate is sodium chlorate and the preferred perchlorate is potassium perchlorate.

Sodium chlorate is a particularly preferred oxygen source because it has a relatively high oxygen yield per unit weight compared to potassium chlorate and a reasonably low decomposition temperature compared to potassium chlorate and perchlorate and lithium perchlorate. Decomposition of sodium chlorate is exothermic once initiated, which is essential for self-sustaining operation of the candle. The price of sodium chlorate is also lower than other alkali metal chlorates and perchlorates.

One or more alkaline compounds of lithium, sodium, potassium, rubidium, cesium, magnesium, calcium, and strontium may be employed as additives to smooth out the chlorate decomposition rate and to suppress free chlorine formation. Lithium aluminate, lithium carbonate, lithium borates, lithium phosphates, lithium silicates, calcium phosphates and pyrophosphates, strontium carbonate, and strontium phosphate are particularly preferred additives because they are stable and have low solubility in water and do not readily hydrate. Sodium aluminate, sodium borates and sodium silicates are also preferred because of their stability and low price.

Temperature programmed decompositions were conducted using a thermal balance such as the Model 409 Thermal Analyzer available from NETZSCH of Germany. The ingredients for each test were intimately mixed by grinding. Approximately 100 mg of the mixture was then heated to raise the temperature thereof at a rate of 20° C./min in an oxygen stream. The weight of each sample at an elevated temperature was compared against its original weight at room temperature. The weight of each sample was recorded and presented as a percentage of its original weight against its temperature presented in FIGS. 1, 1A, 2 and 2A, representing the results of the thermal gravimetric analyses using the Model 409 Analyzer.

Figure 1:
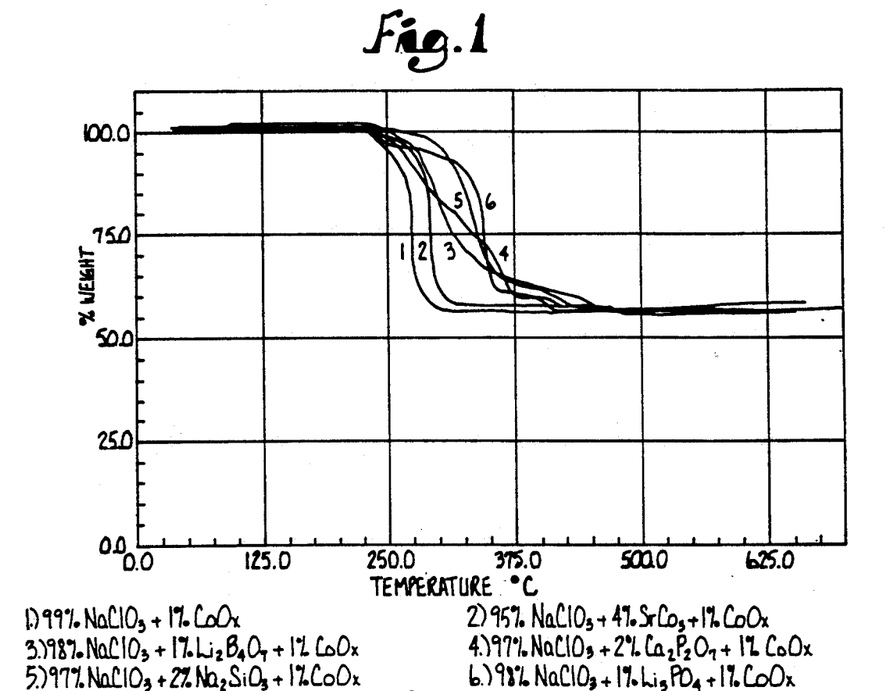
FIG. 1 depicts temperature programmed decomposition profiles of sodium chlorate catalyzed with cobalt oxide, and sodium chlorate compositions catalyzed with cobalt oxide and decomposition smoothing and chlorine inhibiting agents comprising strontium carbonate, lithium tetraborate, calcium pyrophosphate, sodium silicate and lithium phosphate respectively.

In FIG. 1, the temperature programmed decomposition profile of $NaClO_3$ mixed with 1.0% by weight of cobalt oxide catalyst is represented by the line identified by the numeral 1. Cobalt oxide catalyst is represented as $CoO_x$ where $x$=a number from 1.0 to 1.5. Line 2 is the graphical profile representation for decomposition of sodium chlorate containing 1.0% cobalt oxide and 4.0% strontium carbonate. Line 3 is the graphical representation for sodium chlorate decomposition containing 1.0% lithium tetraborate and 1.0% $CoO_x$. Line 4 depicts the decomposition curve for sodium chlorate catalyzed with 1.0% $CoO_x$ and containing 2.0% calcium pyrophosphate. Line 5 indicates the decomposition of sodium chlorate catalyzed with 1.0% $CoO_x$ and containing 2.0% sodium silicate. Line 6 shows the results of sodium chlorate decomposition catalyzed with 1.0% $CoO_x$ and 1.0% lithium phosphate.

Figure 1A:
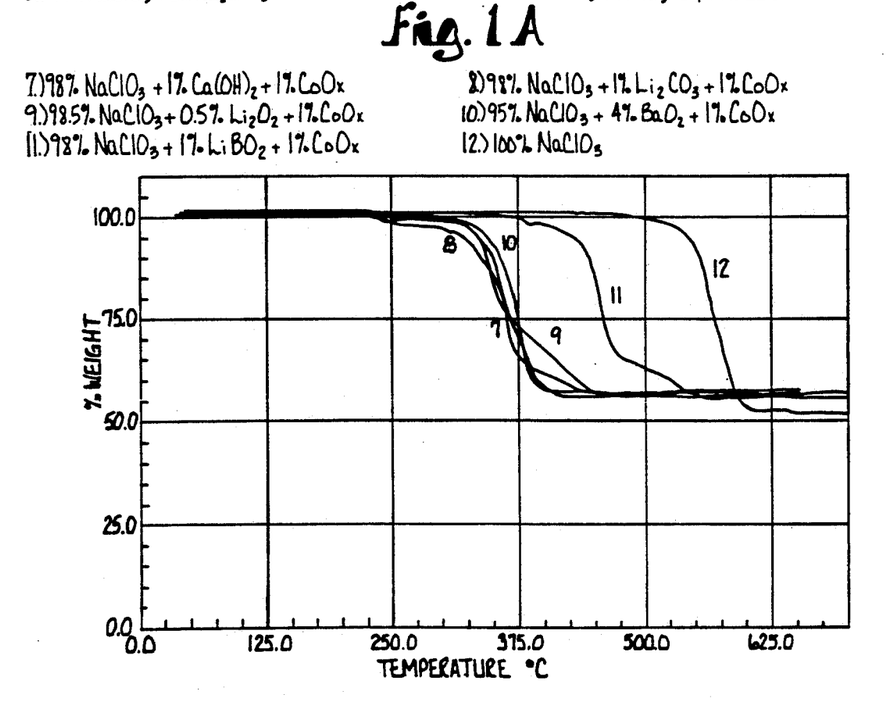
FIG. 1A shows similar decomposition curves for sodium chlorate alone, and sodium chlorate catalyzed with cobalt oxide and containing calcium hydroxide, lithium carbonate, lithium peroxide, barium oxide and lithium metaborate respectively.

FIG. 1A graphically depicts the decomposition curves for sodium chlorate alone as indicated by the line 12 in that figure, while lines 7 to 11 inclusive show decomposition curves for sodium chlorate catalyzed with 1.0% $CoO_x$ and also containing as additives 1.0% calcium hydroxide (line 7), 1.0% lithium carbonate (line 8), 0.5% lithium peroxide (line 9), 4.0% barium oxide (line 10) and 1.0% lithium metaborate (line 11) respectively.

Figure 2:
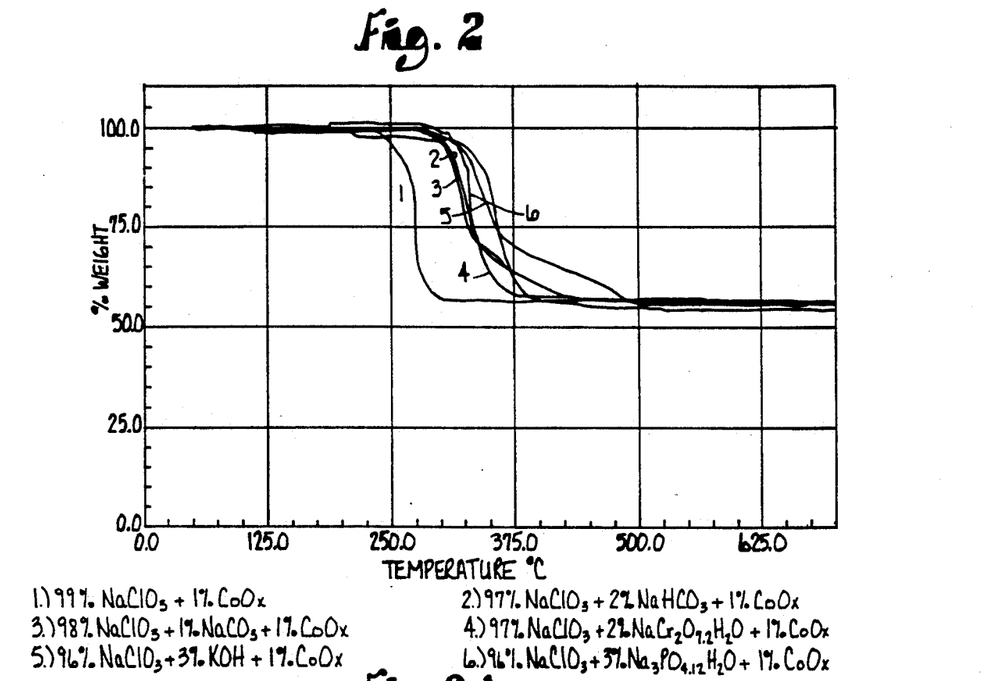
FIG. 2 depicts the effect of cobalt oxide on sodium chlorate decomposition, and illustrates the decomposition curves for sodium chlorate catalyzed with cobalt oxide, and sodium chlorate catalyzed with cobalt oxide and containing sodium bicarbonate, sodium carbonate, sodium chromate, potassium hydroxide, and sodium phosphate respectively.
Figure 2A:
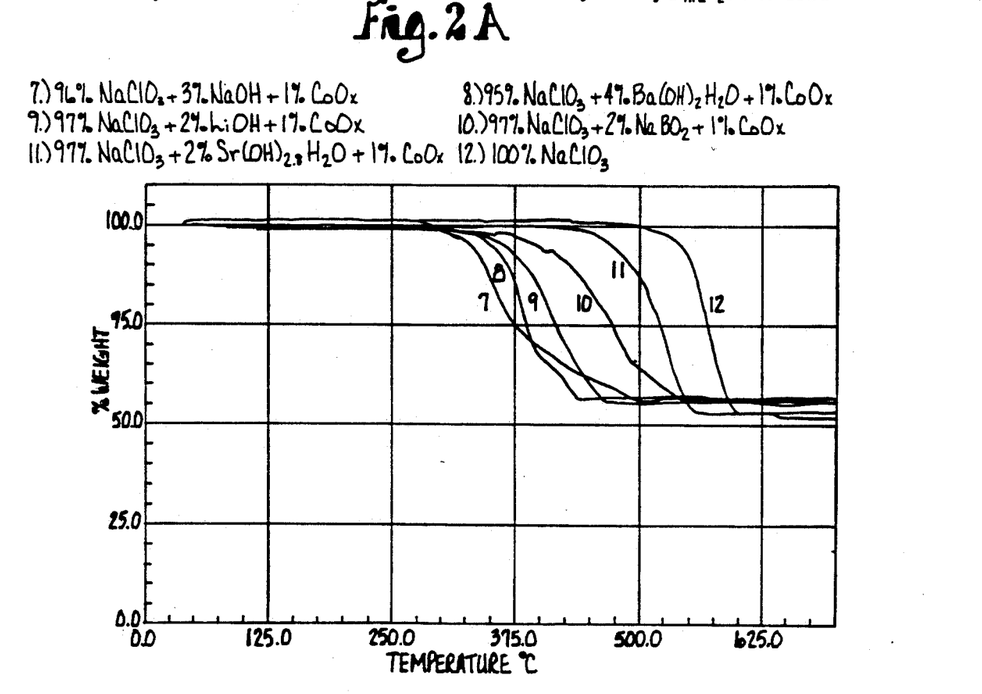
FIG. 2A is a similar depiction of the decomposition curves for sodium chlorate catalyzed with cobalt oxide and containing sodium hydroxide, barium hydroxide, lithium hydroxide, sodium metaborate and strontium hydroxide respectively.

Line 1 and line 12 in FIGS. 2 and 2A depict the decomposition profiles of $NaClO_3$ catalyzed by 1.0% $CoO_x$ and $NaClO_3$ alone respectively. Lines 2–11 in FIGS. 2 and 2A depict the decompositions curves of $NaClO_3$ catalyzed by 1.0% $CoO_x$ and containing 2% $NaHCO_3$, 1% $Na_2CO_3$, 2% $Na_2Cr_2O_7.2H_2O$, 3% $KOH$, 3% $Na_3PO_4.12H_2O$, 3% $NaOH$, 4% $Ba(OH)_2$, 2% $LiOH$, 2% $NaBO_2$, and 2% $Sr(OH)_2.8H_2O$ respectively.

The weight losses of the samples represented by curves 2–8 and 11 of FIGS. 1, 1A and curves 2–11 of FIGS. 2, 2A occurred at temperatures higher than the melting temperature of $NaClO_3$, which indicates that all these alkaline additives are inhibitors for catalyzed $NaClO_3$ decomposition. The alkaline additives referred to in FIGS. 1 and 1A have all been proven to smooth oxygen evolution and suppress chlorine formation for a sodium chlorate candle. It can be seen that the curves presented in FIGS. 2 and 2A are very close to those presented in FIGS. 1 and 1A. Therefore, it can be recognized that the alkaline additives referred to in FIGS. 2 and 2A will smooth oxygen evolution and suppress chlorine formation in a similar manner.

As is evident from curve 12 as illustrated in FIG. 1A, decomposition of the sodium chlorate started at 480° at 590° C. When 1.0% cobalt oxide was mixed, the decomposition started at 225° C. and completed at 300° C. as depicted in curve 1 of FIG. 1 compared to the melting temperature 260° C. for $NaClO_3$. A considerable portion of the $NaClO_3$ decomposed in solid state.

Nonuniform dispersion and irregular contact of the catalyst and $NaClO_3$ can cause a irregular oxygen evolution. When in solid phase, the oxygen produced has to build up pressure and force its way out from inside of a candle core, which can also result in irregular oxygen flow. In addition, the pressure build up can rapture the candle core and result in cracks and thus produce more erratic operation for the candle.

If $NaClO_3$ is made to decompose above its melting temperature 260° C., there is much better contact between the catalyst and liquid $NaClO_3$. Nonuniform density distribution resulting from uneven pressure during the pressing is eliminated. Irregular oxygen evolution resulting from minor cracks is also unimportant since the liquid $NaClO_3$ can fill the cracks. Liquid sodium chlorate has a low viscosity. Oxygen produced inside the liquid phase can get out readily. All these effects contribute to a smoother oxygen evolution.

$BaO_2$ and relatively high levels of $Li_2O_2$ have been used in $NaClO_3$ candles to suppress chlorine formation as previously indicated. Curves 9 and 10 in FIG. 1A are the decomposition profiles of $NaClO_3$ with 1.0% cobalt oxide and 0.5% $Li_2O_2$ and 4.0% $BaO_2$ respectively. Although the lithium peroxide and barium oxide brought the decomposition above $NaClO_3$'s melting temperature and thus contributed to smooth oxygen evolution, the disadvantage of $BaO_2$ as an additive has been described, and the adverse consequences of high $Li_2O_2$ levels has also been explained.

The additives referred to in FIGS. 2 and 2A are less preferred than those set forth in FIGS. 1 and 1A because the former are less stable, exhibit some hygroscopicity, or contain water. Furthermore, the additives of FIGS. 2 and 2A are somewhat harder to disperse than those referred to in FIGS. 1 and 1A.

It is clear from FIGS. 1, 1A, 2 and 2A that alkaline compounds of lithium, sodium, potassium, calcium, strontium, and barium all have an inhibiting effect on catalyzed $NaClO_3$ decomposition and thus can smooth the oxygen evolution and suppress chlorine formation. Rubidium and cesium are very close to sodium and potassium and magnesium is very close to calcium and strontium chemically. Therefore, basic compounds of rubidium, cesium and magnesium can work equally as well.

The inhibiting effect depends on the alkalinity of the additives. Higher alkalinity additive usually provides more inhibiting effect. In basic media chlorine tends to disproportionate into chlorate and chloride especially at elevated temperatures. Therefore, these basic additives can suppress chlorine by either directly reacting with any chlorine formed or by making the candle basic and keeping chlorine from being formed, as a result of shifting of the equilibria involved in chlorate disproportionation.

Additives with small particle size or high surface area are preferred because smaller particle can provide more intimate mixing and thus provide more inhibiting effect. Soluble alkaline compounds such as sodium silicate and borates have more effect because once dissolved the solution can interact with cobalt oxide and sodium chlorate more readily. But once dissolved, these compounds are somewhat more difficult to disperse and a certain degree of hydration and hydrolysis can occur, and thus makes it much harder to dry the candle.

As is evident from FIGS. 1, 1A, 2 and 2A, borates, carbonates, chromates, hydroxides, peroxides, phosphates and silicates of the defined alkali and alkaline earth elements are functional to smooth oxygen evolution and suppress chlorine. Therefore, it is manifest that other alkaline compounds of the said elements such as aluminates, manganates, stannates, titanates, tungstates and zirconates will function in the same manner. Basic salts containing complex anions such as polyphosphates and polysilicates are also useful as alkali metal chlorate or perchlorate candle additives for the same purposes as described previously.

By analogy to sodium bicarbonate ($NaHCO_3$), other acid salts of the elements described previously can also be used to smooth the decomposition and suppress chlorine. For example, acid salts such as $M_2HPO_4$ (M=Li, Na, K, Rb, Cs) and $NHPO_4$ (N=Mg, Ca, Sr) are basic and can thus be used. Monobasic phosphates $MH_2PO_4$ and $N(H_2PO_4)_2$ are generally acidic. But these acidic monobasic phosphates can decompose at relatively low temperature to form a basic salt and thus can also be used. For example, $NaH_2PO_4.2H_2O$ loses 2 $H_2O$ at 100° C., and decomposes to form $Na_2H_2P_2O_7$ at 200° C., and form $Na_3P_3O_9$ between 400° C. and 500° C. These acid salts are generally less preferred because they tend to produce water upon decomposition.

The decomposition temperature of sodium chlorate decreases with increasing cobalt oxide loading and increases with increasing alkaline compound loading. By using a proper combination of cobalt and the alkaline compounds, it is possible to make sodium chlorate decompose at any given temperature between approximately 225° C. and 500° C.

The inhibiting effect of these described alkaline additive compounds are less important to candles which employ alkali chlorates or perchlorates other than sodium chlorate as the oxygen source. For example, the melting temperature of $LiClO_3$ and $LiClO_4$ are 129° C. and 247° C. respectively. The lithium compounds always decompose in liquid phase even when catalyzed by cobalt oxide with no alkaline additive added. An inhibitor is therefore not essential. The melting points of $KClO_3$, $KClO_4$ and $NaClO_3$ are 357° C., 580° C. and 468° C. respectively. Making them decompose above their melting temperature requires a much higher fuel loading to sustain the decomposition and results in hotter generator. Again, alkaline inhibitors are not as essential when any of these are used alone.

In the case of $NaClO_3$ mixed with the other alkali metal chlorates or perchlorates, however, the alkaline compounds work in the same way as for $NaClO_3$ by itself. Examples are $NaClO_3/LiClO_4$ and $NaClO_3/KClO_4$ mixtures. $NaClO_3$ can form eutectic with $LiClO_4$ or $KClO_4$. The melting temperatures of the eutectics are a little lower than $NaClO_3$'s melting temperature. When catalyzed by cobalt oxide, decomposition of the mixtures started at almost the same temperatures as for $NaClO_3$ alone. Therefore, the alkaline additives can raise the decomposition temperature and provide smooth oxygen evolution.

Lithium aluminate, metaborate, tetraborate, phosphates, silicates and carbonate, calcium phosphates and pyrophosphates strontium carbonate are all stable compounds and have very low solubility in water and they do not hydrate. This is a great advantage over other alkaline compounds. Therefore, oxygen generating formulations with these compounds can be either dry or wet mixed. Oxygen generated by candles containing these compounds has a low moisture level.

Calcium phosphate and pyrophosphate are thermally stable. They are insoluble in water and do not hydrate. Both calcium phosphate and pyrophosphate are non-toxic and have long been used in animal food to provide calcium. Therefore, these two calcium compounds are excellent additives to be used in sodium chlorate candles to smooth oxygen evolution and suppress chlorine. $CaHPO_4$ and $Ca(H_2PO_4)_2$ decompose at around 200° C. to form $Ca_3(PO_4)_2$ or $Ca_2P_2O_7$ and can thus be used.

Strontium carbonate is very stable in air. It does not decompose until 1170° C. It does not dissolve in water or hydrate. $SrCO_3$ inhibits to a less extent and raises the decomposition temperature just above the melting point of $NaClO_3$. Therefore, candle containing $SrCO_3$ can have less fuel and the operation temperature will be lower, which is advantageous.

Lithium carbonate is chemically stable. It has low solubility in water and does not hydrate. At elevated temperatures it gradually decomposes to $Li_2O$ and $CO_2$. The decomposition is very slow in air below 850° C. but much faster in molten $NaClO_3$. However, lithium carbonate is a very effective inhibitor. As little as 0.2% $Li_2CO_3$ is enough to produce smooth oxygen evolution. Complete decomposition of the 0.2% $Li_2CO_3$ would produce only less than 2000 ppm $CO_2$ in the oxygen generated compared to allowed $CO_2$ concentration of 5000 pm allowed in many applications.

Sodium metaborate and tetraborate, sodium metasilicate and orthosilicate are inexpensive and thermally very stable. Therefore, they are also good candidates as additives in the oxygen generator to smooth the decomposition and suppress chlorine formation.

The preferred candle composition includes about 0.05% to about 5.0% by weight of $LiAlO_2$, $LiBO_2$, $Li_2CO_3$, $Li_3PO_4$, $Li_2SiO_3$, $Li_2B_4O_7$, $Na_2SiO_3$, with 0.1% to 2.0% being particularly preferred and 0.05% to 10.0% $Ca_2P_2O_7$ or $SrCO_3$, with about 0.2% to 4.0% by weight being particularly preferred. The chemicals purchased from Alfa Products or Aldrich Chemical Inc. have been found to be suitable. The same additives obtained from other sources are suitable so long as they have small particle size. If the additive chemicals as purchased are of relatively large particle size, these additives can also be made useable by grinding into fine powders.

The preferred catalysts include the cobalt oxides, such as $CoO$, $Co_3O_4$, $Co_2O_3$, or $CoO_x$, where x equals 1.0 to 1.5, mixtures thereof. Cobalt oxide is particularly preferred as it can lower the decomposition temperature of sodium chlorate from 450° C. to approximately 230° C. It may be obtained by decomposing cobalt carbonate or cobalt hydroxide. For example, cobalt carbonate may be decomposed at 260° C. for 24 hours to produce a cobalt oxide with a specific surface area of approximately 100 $m^2/g$.

Preferred metal powder fuels include iron, manganese, cobalt, nickel, tungsten, titanium, magnesium, aluminum, niobium, zirconium, and mixtures thereof.

Iron, cobalt, or manganese powder having high purity and high surface area is especially preferred. Iron is particularly suitable. It may be obtained electrolytically or by hydrogen reduction. These processes yield iron powder substantially free of carbon and other impurities which would produce toxic compounds upon operation of the candle. Use of iron powder in the oxygen-generating candle furnishes heat and assists in stabilizing chlorate decomposition. Candles containing iron are less sensitive to surrounding temperatures than catalyzed fuel free candles previously described.

Preferred binders include glass powder, glass fiber, ceramic fiber, steel wool, and mixtures thereof. These binder materials can help to keep integrity of working candles and also help in mixing and pressing.

While the precise chemical reaction is not known, lithium carbonate, metaborate, tetraborate, phosphate and silicate, sodium metasilicate and strontium carbonate are basic and suppress free chlorine formation by either directly reacting chlorine gas or increasing the alkalinity of the candle and keeping chlorine gas from being formed.

The ignition pellet 52 typically may have a composition as follows:

| | |
|---|---|
| Fe | 30% |
| $Fe_2O_3$ | 10% |

-continued

| | |
|---|---|
| $Co_2O_3$ | 10% |
| Glass powder | 5% |
| $NaClO_3$ | 45% |

EXAMPLE 1

| | |
|---|---|
| 1st Layer: | 10.6 gram. 79.0% $NaClO_3$, 10.0% Fe, 7.0% $CoO_x$ and 4.0% glass powder |
| 2nd Layer: | 34.3 gram. 86.9% $NaClO_3$, 7.5% Fe, 0.5% $Li_2B_4O_7$, 2.1% $CoO_x$ and 3.0% glass powder |
| 3rd Layer: | 60.9 gram. 89.7% $NaClO_3$, 6.0% Fe, 0.5% $Li_2B_4O_7$, 0.8% $CoO_x$ and 3.0% glass powder |
| 4th Layer: | 120.2 gram. 93.4% $NaClO_3$, 3.0% Fe, 0.5% $Li_2B_4O_7$, 0.6% $CoO_x$, and 2.5% glass powder |

Figure 3:
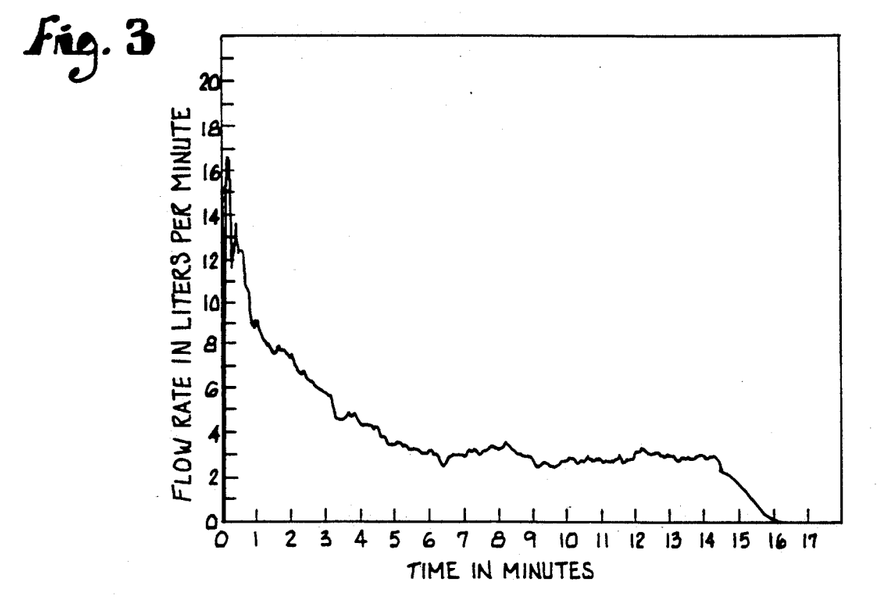
FIG. 3 is a graphical representation of the rate of flow of oxygen from a candle composition as set forth in Example 1.

The candle lasted for 16.2 minutes with a oxygen release of 68.5 liters at room temperature by weight change. The impurities levels are 1,080 ppm $CO_2$, 1 ppm CO, less than 20 ppb chlorine, and 6.6 mg water per liter oxygen. The oxygen flow over time is shown in FIG. 3.

EXAMPLE 2

| | |
|---|---|
| 1st Layer: | 10.6 gram. 79.0% $NaClO_3$, 10.0% Fe, 9.0% $CoO_x$ and 2.0% glass powder |
| 2nd Layer: | 34.3 gram. 86.5% $NaClO_3$, 8.0% Fe, 0.5% $LiBO_2$, 3.0% $CoO_x$ and 2.0% glass powder |
| 3rd Layer: | 178.4 gram. 89.5% $NaClO_3$, 6.0% Fe, 0.5% $LiBO_2$, 2.0% $CoO_x$ and 2.0% glass powder |

Figure 4:
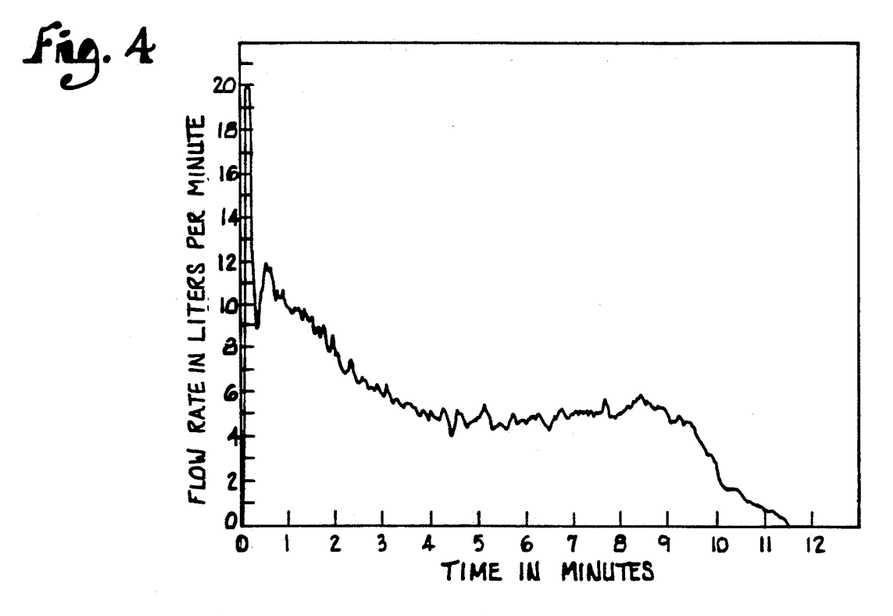
FIG. 4 is a graphical representation of the rate of flow of oxygen from a candle composition as set forth in Example 2.

The candle lasted for 10.5 minutes with a oxygen release of 64.9 liters at room temperature by weight change. The impurity levels are 995 ppm $CO_2$, 1 ppm CO, less than 20 ppb chlorine, and 6.4 mg water per liter oxygen. The oxygen flow rate over time is shown in FIG. 4.

EXAMPLE 3

| | |
|---|---|
| 1st Layer: | 10.6 gram. 80.0% $NaClO_3$, 10.0% Fe, 7.0% $CoO_x$ and 3.0% glass powder |
| 2nd Layer: | 34.3 gram. 87.9% $NaClO_3$, 7.5% Fe, 1.0% $Li_3PO_4$, 1.6% $CoO_x$ and 2.0% glass powder |
| 3rd Layer: | 60.9 gram. 90.2% $NaClO_3$, 6.0% Fe, 1.0% $Li_3PO_4$, 0.8% $CoO_x$ and 2.0% glass powder |
| 4th Layer: | 120.2 gram. 93.6% $NaClO_3$, 3.0% Fe, 1.0% $Li_3PO_4$, 0.4% $CoO_x$, and 2.0% glass powder |

Figure 5:
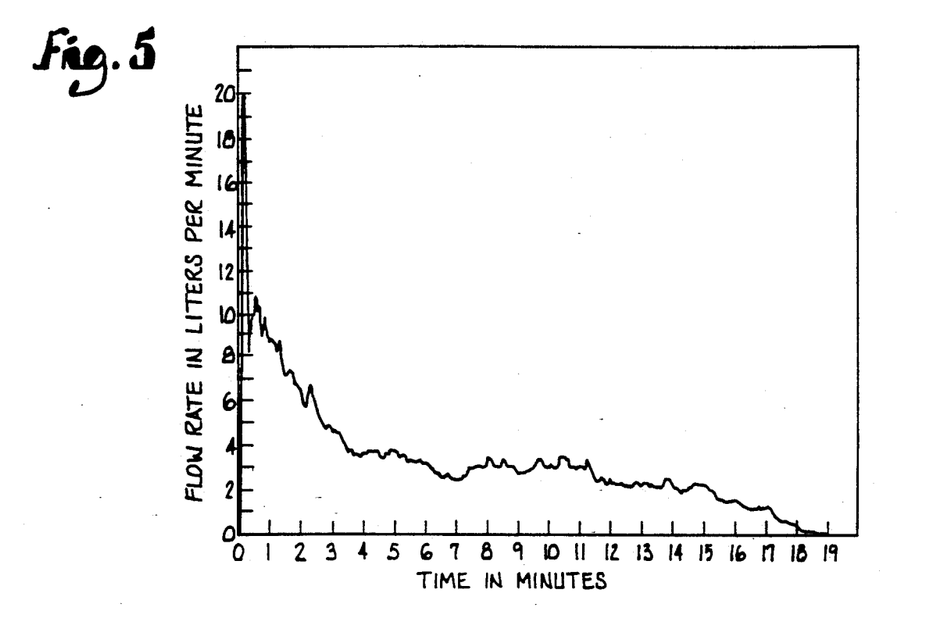
FIG. 5 is a graphical representation of the rate of flow of oxygen from a candle composition as set forth in Example 3.

The candle lasted for 18.2 minutes with a oxygen release of 67.0 liters at room temperature by weight change. The oxygen contains 1 ppm CO, 920 ppm $CO_2$, 0 ppb $Cl_2$, and 4.8 mg $H_2O$ per liter oxygen. The oxygen flow rate over time is shown in FIG. 5.

EXAMPLE 4

| | |
|---|---|
| 1st Layer: | 10.6 gram. 77.0% $NaClO_3$, 11.0% Fe, 9.0% $CoO_x$ and 3.0% glass powder |
| 2nd Layer: | 34.3 gram. 87.7% $NaClO_3$, 7.5% Fe, 0.2% $Li_2CO_3$, 1.6% $CoO_x$ and 3.0% glass powder |
| 3rd Layer: | 60.9 gram. 90.0% $NaClO_3$, 6.0% Fe, 0.2% $Li_2CO_3$, 0.8% $CoO_x$ and 3.0% glass powder |
| 4th Layer: | 80.8 gram. 94.4% $NaClO_3$, 3.0% Fe, 0.2% $Li_2CO_3$, 0.4% $CoO_x$ and 2.0% glass powder |
| 5th Layer: | 41.4 gram. 96.2% $NaClO_3$, 1.3% Fe, 0.2% $Li_2CO_3$, 0.3% $CoO_x$ and 2.0% glass powder |

The candle lasted for 15.3 minutes with a oxygen release of 69.3 liters at room temperature by weight change. The impurity levels are 1490 ppm $CO_2$, 1 ppm CO, less than 20 ppb chlorine, 5.0 mg water per liter oxygen, and the oxygen evolution was smooth.

EXAMPLE 5

| | |
|---|---|
| 1st Layer: | 10.6 gram. 81.0% $NaClO_3$, 9.0% Fe, 8.0% $CoO_x$ and 2.0% glass powder |
| 2nd Layer: | 34.3 gram. 85.5% $NaClO_3$, 8.0 Fe, 0.5% $Na_2SiO_3$, 4.0% $CoO_x$ and 2.0% glass powder |
| 3rd Layer: | 60.9 gram. 90.9% $NaClO_3$, 5.5 Fe, 0.5% $Na_2SiO_3$, 2.1% $CoO_x$ and 2.0% glass powder |
| 4th Layer: | 120.3 gram. 92.7% $NaClO_3$, 3.5 Fe, 0.5% $Na_2SiO_3$, 1.5% $CoO_x$ and 2.0% glass powder |

Figure 6:
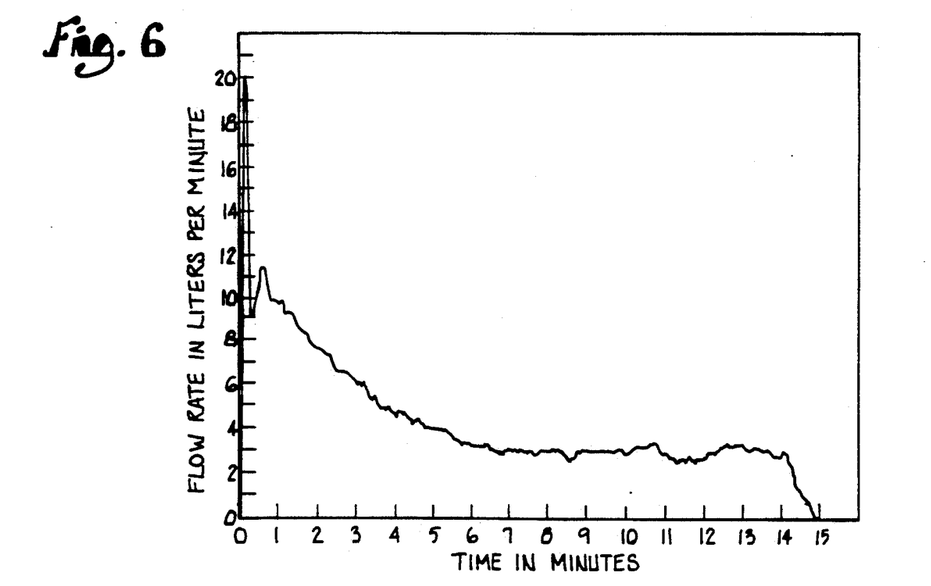
FIG. 6 is a graphical representation of the rate of flow of oxygen from a candle composition as set forth in Example 5.

The candle lasted for 14.7 minutes with a oxygen release of 67.8 liters at room temperature by weight change. The oxygen flow over time is given in FIG. 6. The impurity levels of the oxygen are 0 ppm CO, 1530 ppm $CO_2$, 0 ppb $Cl_2$, and 7.3 mg $H_2O$ per liter oxygen.

EXAMPLE 6

| | |
|---|---|
| 1st Layer: | 10.6 gram. 77.0% $NaClO_3$, 11.0% Fe, 9.0% $CoO_x$ and 3.0% glass powder |
| 2nd Layer: | 34.3 gram. 87.8% $NaClO_3$, 8.0% Fe, 0.5% $Li_2CO_3$, 1.7% $CoO_x$ and 2.0% glass powder |
| 3rd Layer: | 60.9 gram. 90.7% $NaClO_3$, 6.0% Fe, 0.5% $Li_2CO_3$, 0.8% $CoO_x$ and 2.0% glass powder |
| 4th Layer: | 83.7 gram. 94% $NaClO_3$, 3.1% Fe, 0.5% $Li_2CO_3$, 0.4% $CoO_x$ and 2.0% glass powder |
| 5th Layer: | 36.4 gram. 96.0% $NaClO_3$, 1.2% Fe, 0.5% $Li_2CO_3$, 0.3% $CoO_x$ and 2.0% glass powder |

Figure 7:
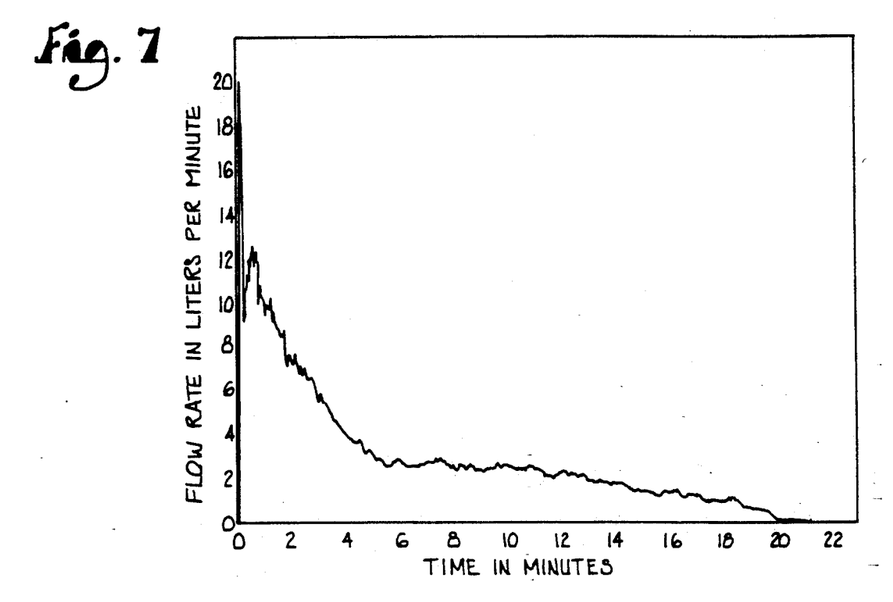
FIG. 7 is a graphical representation of the rate of flow of oxygen from a candle composition as set forth in Example 6.

The candle lasted for 21.2 minutes with a oxygen release of 69.2 liters at room temperature by weight change. The oxygen flow over time is shown in FIG. 7.

EXAMPLE 7

| | |
|---|---|
| 1st Layer: | 10.6 gram. 80.0% $NaClO_3$, 10.0% Fe, 7.0% $CoO_x$ and 3.0% glass powder |
| 2nd Layer: | 34.3 gram. 87.3% $NaClO_3$, 7.5% Fe, 0.5% $Li_2SiO_3$, 1.7% $CoO_x$ and 3.0% glass powder |
| 3rd Layer: | 60.9 gram. 89.5% $NaClO_3$, 6.0% Fe, 0.5% $Li_2SiO_3$, 1.0% $CoO_x$ and 3.0% glass powder |
| 4th Layer: | 120.3 gram. 92.7% $NaClO_3$, 3.5% Fe, 0.5% $Li_2SiO_3$, 0.8% $CoO_x$ and 2.5% glass powder |

The candle lasted for 14.5 minutes with a oxygen release of 66.2 liters at room temperature by weight change and the oxygen evolution was smooth. The impurity levels are 7 ppm CO, 580 ppm $CO_2$, 0 ppb $Cl_2$, and 6.1 mg $H_2O$ per liter oxygen.

EXAMPLE 8

| | |
|---|---|
| 1st Layer: | 10.6 gram. 80.0% $NaClO_3$, 10.0% Fe, 7.0% $CoO_x$ and 3.0% glass powder |
| 2nd Layer: | 34.3 gram. 85.9% $NaClO_3$, 7.5% Fe, 2.0% $Ca_2P_2O_7$, 1.6% $CoO_x$ and 3.0% glass powder |
| 3rd Layer: | 60.9 gram. 88.5% $NaClO_3$, 6.0% Fe, 2.0% $Ca_2P_2O_7$, 0.5% $CoO_x$ and 3.0% glass powder |
| 4th Layer: | 120.3 gram. 92.5% $NaClO_3$, 3.2% Fe, 2.0% $Ca_2P_2O_7$, 0.3% $CoO_x$ and 2.0% glass powder |

The candle lasted for 12.4 minutes with a oxygen release of 67.4 liters at room temperature by weight change and the oxygen evolution was smooth. The impurity levels are 8 ppm CO, 950 ppm $CO_2$, 0 ppb $Cl_2$, and 6.4 mg $H_2O$ per liter oxygen.

We claim:

1. In an oxygen-generating candle composition that includes a preponderant amount on a weight basis of an alkali metal chlorate or perchlorate oxygen source other than lithium perchlorate alone, together with from about 1.2-30% by weight of a metal fuel powder, selected from the group consisting of iron, cobalt and manganese, and which upon ignition and decomposition thereof will yield oxygen and residual chlorine, the improvement which comprises a non-toxic additive incorporated into the candle composition at a level of from about 0.05-10% by weight for suppression of the residual chlorine and to enhance uniform oxygen generation and evolution, said additive being an alkaline compound selected from the group consisting of compounds of the formula $M_aH_bX_cO_d$ where M=an alkali metal or alkaline earth metal, a=a number which is one or more, H=hydrogen, b=a number which is 0, or one or more, X=an element chosen from the group consisting of the elements of Group IIIA, the elements of Group IVA, the elements identified by the numbers 15 and 51 of Group VA, the elements of Group IVB, the elements of Group VB, the elements of Group VIB, and the element identified by the number 25 of Group VIIB of the Periodic Table, c=a number which is one or more, O=oxygen, and d=a number which is one or more.

2. The oxygen-generating candle composition of claim 1, wherein said additive is an alkaline compound selected from the group consisting of alkali metal and alkaline earth metal aluminates, borates, carbonates, chromates, germinates, hafnates, manganates, molybdenates, niobates, phosphates, silicates, stanates, tantalates, titanates, tungstates, vanadates, zirconates, and derivatives of the foregoing compounds in which the alkali metal and alkaline earth metal cations are partially substituted by hydrogen.

3. The oxygen-generating candle composition of claim 1, wherein said additive is lithium tetraborate.

4. The oxygen-generating candle composition of claim 1, wherein said additive is lithium metaborate.

5. The oxygen-generating candle composition of claim 1, wherein said additive is lithium phosphate.

6. The oxygen-generating candle composition of claim 1, wherein said additive is lithium carbonate.

7. The oxygen-generating candle composition of claim 1, wherein said additive is lithium silicate.

8. The oxygen-generating candle composition of claim 1, wherein the additive is a lithium compound provided in an amount of from about 0.05% to about 5% by weight of the candle composition.

9. The oxygen-generating candle composition of claim 1, wherein the additive is a lithium compound provided in an amount of from about 0.1% to about 2% by weight of the candle composition.

10. The oxygen-generating candle composition of claim 1, wherein the additive is a sodium compound provided in an amount of from about 0.05% to about 5% by weight of the candle composition.

11. The oxygen-generating candle composition of claim 1, wherein the additive is a sodium compound provided in an amount of from about 0.1% to about 2% by weight of the candle composition.

12. The oxygen-generating candle composition of claim 1, wherein the additive is a calcium compound provided in an amount of from about 0.05% to about 10% by weight of the candle composition.

13. The oxygen-generating candle composition of claim 1, wherein the additive is a calcium compound provided in an amount of from about 0.2% to about 4% by weight of the candle composition.

14. The oxygen-generating candle composition of claim 1, wherein the additive is a strontium compound provided in an amount of from about 0.05% to about 10% by weight of the candle composition.

15. The oxygen-generating candle composition of claim 1, wherein the additive is a strontium compound provided in an amount of from about 0.2% to about 4% by weight of the candle composition.

16. The oxygen-generating candle composition of claim 1, wherein is further included a binder selected from the group consisting of glass powder, glass fibers, ceramic fibers, steel wool, and mixtures of the foregoing.

17. The oxygen-generating candle composition of claim 1, wherein is further included a cobalt catalyst in the candle composition.

18. The oxygen-generating candle composition of claim 17, wherein said fuel is powdered iron.

19. The oxygen-generating candle composition of claim 17, wherein said cobalt catalyst is a cobalt oxide.

20. The oxygen-generating candle composition of claim 19, wherein said cobalt catalyst is selected from the group consisting of CoO, $Co_3O_4$, $Co_2O_3$ and $Co_x$, wherein x ranges from about 1 to about 1.5, and mixtures of the foregoing.

21. The oxygen-generating candle composition of claim 20, wherein said cobalt catalyst is present in an amount of from about 0.1% to about 5% by weight of the candle composition.

22. In an method of generating breathable oxygen as a result of the initiation and operation of a candle composition that includes a cobalt oxide catalyzed alkali metal chlorate or perchlorate oxygen source other than lithium perchlorate alone, said oxygen source being present in a preponderant amount on a weight basis, said composition having from about 1.2-30% by weight of a metal fuel powder selected from the group consisting of iron, cobalt and manganese, the improved step of adding a non-toxic additive to the oxygen source in order to increase the decomposition temperature of the alkali metal chlorate or perchlorate to a level above the melting temperature thereof that assure steady oxygen generation, said step including introducing into the chlorate or perchlorate before initiation thereof, from about 0.05-10% by weight of an alkaline compound selected from the group consisting of compounds of the formula $M_aH_bX_cO_d$ where M=an alkali metal or alkaline earth metal, a=a number which is one or more, H=hydrogen, b=a number which is 0, or one or more, X=an element chosen from the group consisting of the elements of Group IIIA, the elements of Group IVA, the elements identified by the numbers 15 and 51 of Group VA, the elements of Group IVB, the elements of Group VB, the elements of Group VIB, and the element identified by the number 25 of Group VIIB of the Periodic Table, c=a number which is one or more, O=oxygen, and d=a number which is one or more.

23. A method of generating breathable oxygen as set forth in claim 22, wherein the step of introducing an alkaline compound into the alkali metal chlorate or perchlorate oxygen source includes adding a compound selected from the group consisting of alkali metal and alkaline earth metal aluminates, borates, carbonates, chromates, germinates, hafnates, manganates, molybdenates, niobates, phosphates, silicates, stanates, tantalates, titanates, tungstates, vanadates, zirconates, and derivatives of the foregoing compounds in which the alkali metal and alkaline earth metal cations are partially substituted by hydrogen.

24. A method of generating breathable oxygen as set forth in claim 22, wherein the step of introducing an alkaline compound into the alkali metal chlorate or perchlorate oxygen source includes incorporating a lithium compound selected from said group which is provided in an amount from about 0.05% to about 5% by weight of the candle composition.

25. A method of generating breathable oxygen as set forth in claim 22, wherein the step of introducing an alkaline compound into the alkali metal chlorate or perchlorate oxygen source includes incorporating a sodium compound selected from said group which is provided in an amount from about 0.05% to about 5% by weight of the candle composition.

26. A method of generating breathable oxygen as set forth in claim 22, wherein the step of introducing an alkaline compound into the alkali metal chlorate or perchlorate oxygen source includes incorporating a potassium compound selected from said group which is provided in an amount from about 0.05% to about 5% by weight of the candle composition.

27. A method of generating breathable oxygen as set forth in claim 22, wherein the step of introducing an alkaline compound into the alkali metal chlorate or perchlorate oxygen source includes incorporating a calcium compound selected from said group which is provided in an amount from about 0.05% to about 5% by weight of the candle composition.

28. A method of generating breathable oxygen as set forth in claim 22, wherein the step of introducing an alkaline compound into the alkali metal chlorate or perchlorate oxygen source includes incorporating a strontium compound selected from said group which is provided in an amount from about 0.05% to about 5% by weight of the candle composition.

* * * * *